United States Patent
Vogt et al.

(10) Patent No.: US 6,170,732 B1
(45) Date of Patent: Jan. 9, 2001

(54) DEVICE AND METHOD FOR FEEDING, CLAMPING AND PROCESSING, PARTICULARLY FOR GEOMETRIC WELDING OF AUTOMOBILE WELDING COMPONENTS IN A WORK STATION

(75) Inventors: Franz-Josef Vogt, Waldburg; Wolf Dieter Lang, Schlier; Thomas Ego, Ravensburg; Kurt Jäck, Aulendorf; Hans Peter Erb, Berg; Erich Zimmer, Wadern-Lockweiler; Bernd Röhling, Burghaun; Manfred Wiegand, Hunfeld, all of (DE)

(73) Assignee: Thyssen Krupp Industries GmbH (DE)

( * ) Notice: Under 35 U.S.C. 154(b), the term of this patent shall be extended for 0 days.

(21) Appl. No.: 09/380,216

(22) PCT Filed: Feb. 19, 1998

(86) PCT No.: PCT/EP98/00944
§ 371 Date: Aug. 25, 1999
§ 102(e) Date: Aug. 25, 1999

(87) PCT Pub. No.: WO98/42477
PCT Pub. Date: Oct. 1, 1998

(30) Foreign Application Priority Data

Mar. 22, 1997 (DE) ............................................. 197 12 129

(51) Int. Cl.$^7$ ........................................................ B23K 9/12
(52) U.S. Cl. ........................... 228/4.1; 228/212; 219/652; 219/80
(58) Field of Search ................................ 228/8, 44.3, 4.1, 228/47.1, 49.1, 212; 219/659, 652, 158; 269/37, 40

(56) References Cited

U.S. PATENT DOCUMENTS 4,162,387 * 7/1979 De Candia ............................ 219/79
4,667,866 5/1987 Tobita et al. .

(List continued on next page.)

FOREIGN PATENT DOCUMENTS

| 28 10 822 C3 | 9/1978 | (DE) . |
| 32 30 455 A1 | 12/1983 | (DE) . |
| 2 191 740 | 12/1987 | (GB) . |
| WO 95/32886 | 12/1995 | (WO) . |

* cited by examiner

Primary Examiner—Patrick Ryan
Assistant Examiner—Jonathan Johnson
(74) Attorney, Agent, or Firm—McGlew and Tuttle, P.C.

(57) ABSTRACT

The invention concerns a method and a device for feeding, clamping, and processing, particularly for geometric welding of automobile body components in a work station. The invention method consists of side-section clamping frames which, after receiving a body side section with the help of portal robots which travel along an elevated four-axle portal in the X-Y axis, are brought into the geometrical welding station, positioned at both sides of the body conveyer system for geometrical welding. The device is characterized in that a four-axle portal (2) is arranged above the geometrical welding station and along which four-axle portal (2), on each side of the body conveyer system (1), at least one portal robot (3), from which side-section clamping frames (9) are hung, can travel in the X-Y axis between a position for receiving the body side sections (8) and a position for clamping and welding the body. The four-axle portal (2) consists of rails (5) which are stationary and parallel or at right angles to the body conveyer system (1), one or more cross members (4) which can travel along the rails (5), one or more portal robots (3) which can travel in the longitudinal direction of the cross members (4), and side-section clamping frames (9) which are vertically movable and/or rotatably attached about a ventricle axis on the portal robot (3).

8 Claims, 6 Drawing Sheets

U.S. PATENT DOCUMENTS

| | | | |
|---|---|---|---|
| 4,673,075 | * 6/1987 | Ueyama et al. | 198/339.1 |
| 4,721,005 | * 1/1988 | Yoshiji et al. | 74/479 |
| 4,811,891 | 3/1989 | Yamaoka et al. | |
| 4,905,884 | * 3/1990 | Alborante et al. | 228/4.1 |
| 4,972,987 | * 11/1990 | Di Rosa | 228/4.1 |
| 5,143,270 | * 9/1992 | Hamada et al. | 228/4.1 |
| 5,258,598 | * 11/1993 | Alborante | 219/86.41 |
| 5,265,317 | * 11/1993 | Angel | 29/429 |
| 5,374,799 | * 12/1994 | Nishimoto et al. | 219/117.1 |
| 5,400,944 | * 3/1995 | Zimmer et al. | 228/49.6 |
| 5,409,158 | * 4/1995 | Angel | 228/182 |

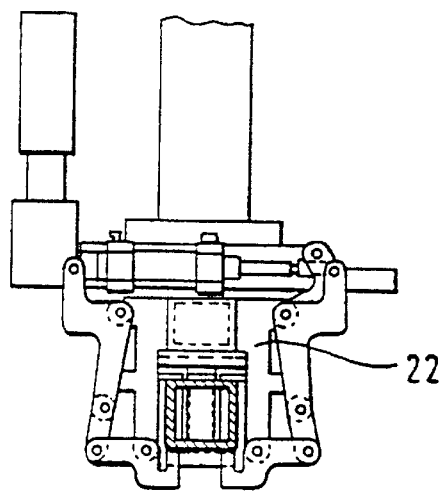
Fig. 4
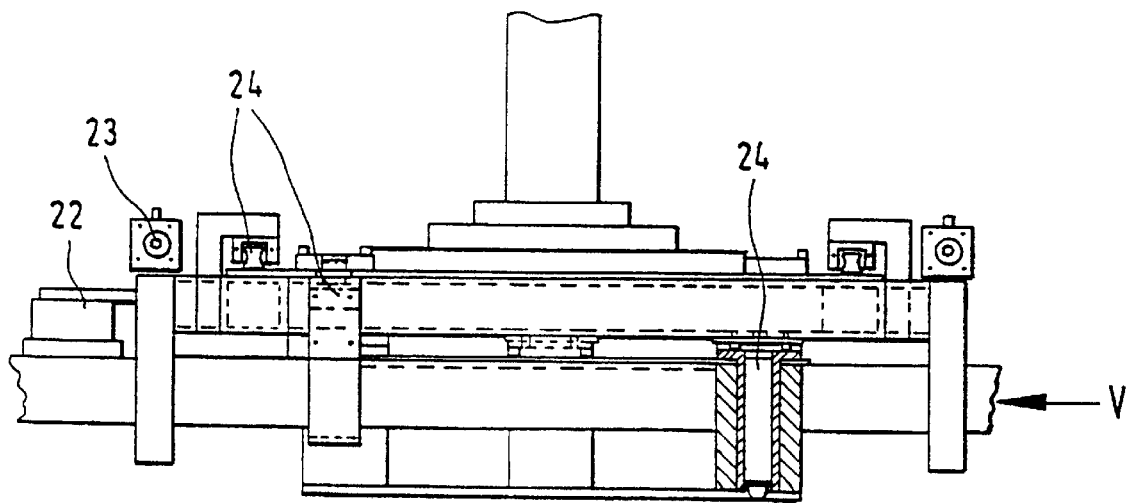

DEVICE AND METHOD FOR FEEDING, CLAMPING AND PROCESSING, PARTICULARLY FOR GEOMETRIC WELDING OF AUTOMOBILE WELDING COMPONENTS IN A WORK STATION

FIELD OF THE INVENTION

The invention relates to a method for feeding, clamping and processing, particularly for geometric welding of car body components in a processing station, where the underbody group of the car body, if any, is brought jointly with at least one front wall through a car body conveyor system into the station for geometric welding and exactly positioned there, and with the car body side sections being laid into a side section clamping frame, positioned in the welding station, clamped with the components to be welded, and where car body side sections, underbody group and, if any, roof sections are joined to a car body structure by the aid of welding robots arranged laterally and/or above the car body by way of geometric welding and subsequently welded together completely, preferably in another welding station. The invention also relates to a device for feeding, clamping and processing, particularly for geometric welding of car body components in a processing station.

BACKGROUND OF THE INVENTION

From DE 2810 822 C2 and DE 32 30 455 C2 devices are known for welding of loosely joined car bodies for motor vehicles. The devices have a welding and a fixing place in which a transport track is located to transport the car body. Side section carriers are movable from a standby position into a working position and back and mounted at each side of the transport track by positioning devices pressable against the car body and having positioning arms adapted to the geometric shape of the car body to be welded. At least one welding device is located laterally of the transport track and provided with a welding head. The welding head is adjustable to the car body.

The positioning devices of each side are arranged at side section carriers which in a swivable arrangement are hung to rails running in the transport direction of the car body and are configured as a rotary axle. The side section carriers act as side section clamping frames for those car body side sections which have already before been loosely connected with the underbody in a separate working cycle. To exchange the side section carriers for a set of other side section carriers whose positioning device is adjusted to the geometric shape of another car body type, these side section carriers are moved along the rails in the car body transport direction. For loose joining of a car body, particularly for mounting of car body side sections and for subsequent geometric welding and, if required, for welding-out, independent stations are required which need much free space. Moreover, a changeover from one car body type to another is relatively extensive.

From WO95/32886 a generic method and a device are known for feeding, clamping and processing of car body components in a processing station where the components are clamped with one or several clamping frame(s) and where the clamping frames for the side section frames and the roof frames are handled and fed by one or more multipleaxle manipulator(2). By the aid of the manipulators, the clamping frames are supported against each other, positioned and locked, thus forming a clamping frame casing surrounding the component parts at least at four sides. The clamping frames are equipped with suitable positioning devices and form a self-carrying clamping frame casing which is preferably closed in annular or cubic form around the car body. It takes a great deal of space in a hall and geometric welding can not be started until the whole clamping frame casing is closed.

SUMMARY AND OBJECTS OF THE INVENTION

It is the primary object of this invention to provide a generic method and a device for execution of this method in which said problems do not occur.

According to the invention, a method for feeding, clamping and processing, particularly for geometric welding of car body components in a processing station is provided. The underbody group of the car body, if any, is brought jointly with at least one front wall through a car body conveyor system into the station for geometric welding and exactly positioned there, with the car body side sections being laid into a side section clamping frame, positioned in the welding station, clamped with the components to be welded. Car body side sections, underbody group and, if any, roof sections are joined to a car body structure by the aid of welding robots arranged laterally and/or above the car body by way of geometric welding and subsequently welded together completely, preferably in another welding station. The side section clamping frames are brought into the geometric welding station by the aid of portal robots movable in X/Y direction at an elevated four-axle portal, positioned at both sides of the car body and clamped with the components to be welded. The welding robots are mounted laterally beside the car body conveyor system and are swung and/or moved towards the welding spots.

According to the invention, a device for feeding, clamping and processing, particularly for geometric welding of car body components in a processing station is also provided. The device has a car body conveyor system for transportation and exact positioning of the underbody group of the car body in the geometric welding station. Side section clamping frames for feeding of car body side sections, feeder units, if required, for the front and rear roof cross members are provided. Clamping devices are provided for joining and clamping of components to be welded, particularly of car body side sections, and formed of welding robots located beside the car body conveyor system in a swivable or movable arrangement for geometric welding of joined and clamped components. The geometric welding station has a four-axle portal at which at each side of the car body conveyor system at least one portal robot with side section clamping frames is movable in X and Y direction between a position for clamping and welding of the car body. The four-axle portal includes stationary rails arranged in parallel or rectangularly to the car body conveyor system, one or more cross members movable on the stationary rails, one or more portal robots movable in a longitudinal direction of the cross members, and side section clamping frames affixed vertically at the portal robot in movable arrangement and/or rotatably around a vertical axle.

The geometric welding system in accordance with this invention is a flexible combination-type tool concept for geometric welding of motor vehicle bodies (underbody, side sections, roof cross members, and roof plate) which is of a modular structure. By use of an elevated four-axle portal at which portal robots travel in X and Y direction, numerous tool deposits for side section clamping frames can be properly arranged in the area of the four-axle portal in such a manner that these are directly accessible for a portal robot.

The number of car body models which can be welded by the system is preferably limited only by the number of car body side section tool deposits in the system, but can be extended flexibly.

The car body side sections laid manually and/or by a robot into the side section clamping frame can be positioned at both sides of the car body by one portal robot each which is adjustable in height and rotatable around a vertical axle and, if required, the body side sections can be clamped by the aid of stationary positioning and clamping elements with those parts to be welded. Subsequently, for geometric welding, the welding robots located laterally beside the car body conveyor system, are swung towards the welding spot and/or moved appropriately. As a result of the fact that the portal robots for the side section clamping frames hang at an elevated four-axle portal and are movable in X and Y direction, the welding robots standing laterally on the ground floor can be moved unrestrictedly for the welding process, and the whole space is well accessible for all the maintenance and handling work.

The four-axle portal in accordance with this invention consists of stationary rails arranged in parallel or rectangularly to the car body conveyor system, one or several cross members movable on these rails, one or more portal robot(s) movable in longitudinal direction on the cross members, and vertically fixed side section clamping frames being movable and/or rotatable around a vertical axle. The portal robots thus in principle can directly approach all the areas of the field framed by the rails and cross members and effect a change of side section clamping frames at any spot or take-up the car body side members with the side section clamping frames.

In accordance with the invention, it has turned out to be favorable to have a cross beam on each side of the car body conveyor system in case of stationary rails running transversely to the car body conveyor system, with at least one portal robot being movable on said cross beam within the local area of the four-axle portal. Then it is possible for the portal robots with their cross beams to approach the raw car body simultaneously from both sides. To effect a change in models, both portal robots can then move to an appropriate clamping frame station to take-up new side member clamping frames there in order to take other car body side sections to the next raw car body. To shorten cycle time, particularly in case of frequent model changes, a device called megaframing station turned out to be favorable. Here, the stationary rails runs at left and in parallel beside the car body conveyor system. In principle, as many cross members as desired can be movable on these stationary rails in consecutive mode in the pass-through direction of raw car bodies. But here the special feature is that at least two portal robots are movable on each cross member by the aid of which the left and right car body side section can be fed at the same time. Moreover, during this joining procedure, the portal robots on one or several neighboring cross member(s) can be equipped simultaneously with new side section clamping frames and/or car body side sections. Thus it is manageable to achieve an extremely short cycle time.

The side section clamping frames and, if required, the clamping frames for the front and rear cross members, too, can be hung in floating arrangement to the portal robot and/or feeder units by the aid of flexible offset elements as provided for under this invention and dispose of detachable connections to allow for supply media.

Some advantages of the system can be summarized in key words as follows:

modular structure;

unlimited choice of models and, respectively, high flexibility;

no multiple geometry;

good accessibility of robots;

simple assembly;

maintenance-friendly;

optimum changeover concept;

simple clamping frame station;

simple feed of component parts, particularly of side sections and roof cross members;

use of as many welding robots as desired; and sufficient space for roof feeding.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS In the drawings:

FIG. 4 is a detail Z relative to FIG. 2 and a view V relative to detail Z;

DESCRIPTION OF THE PREFERRED EMBODIMENT

Figure 1:
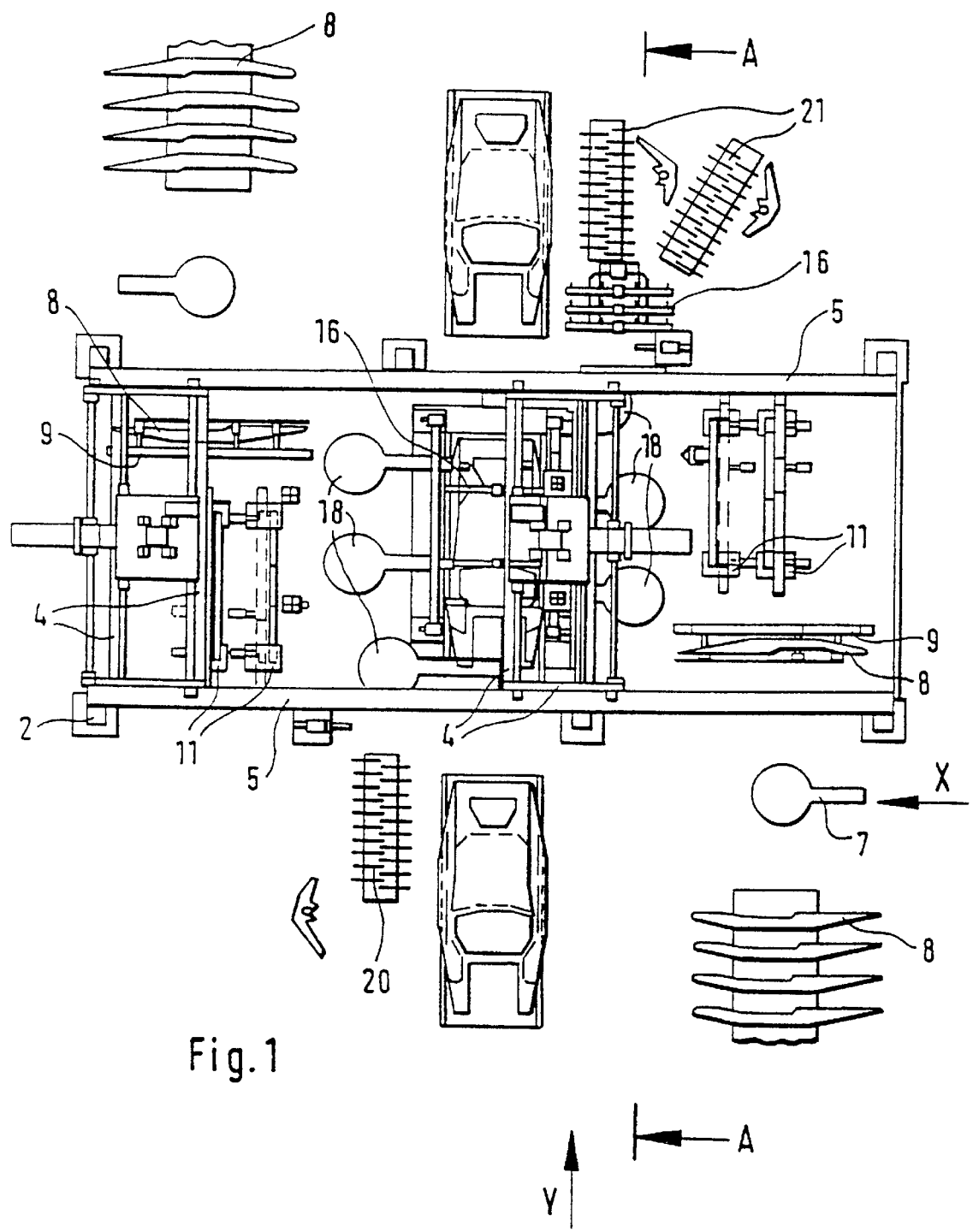
FIG. 1 is a top view on a geometric welding station.

Referring to the drawings in particular, the understructure of a car body, if required, is brought jointly with a front wall through a car body conveyor system 1 into the frame welding station and positioned and clamped there. The car body side sections 8 are either laid manually or through an automatic feeder in the form of a robot 7 into the side section clamping frame 9 and brought by portal robot 3 which is movable on cross member 4 and rails 5 of the four-axle portal 2 into the geometric welding station. The car body side sections 8 are positioned in the station by the aid of side section clamping frame 9, clamped to form a complete compound with the steel structure around the car body. Thus the geometry of the raw car bodies fabricated with this system is always identical.

Figure 2:
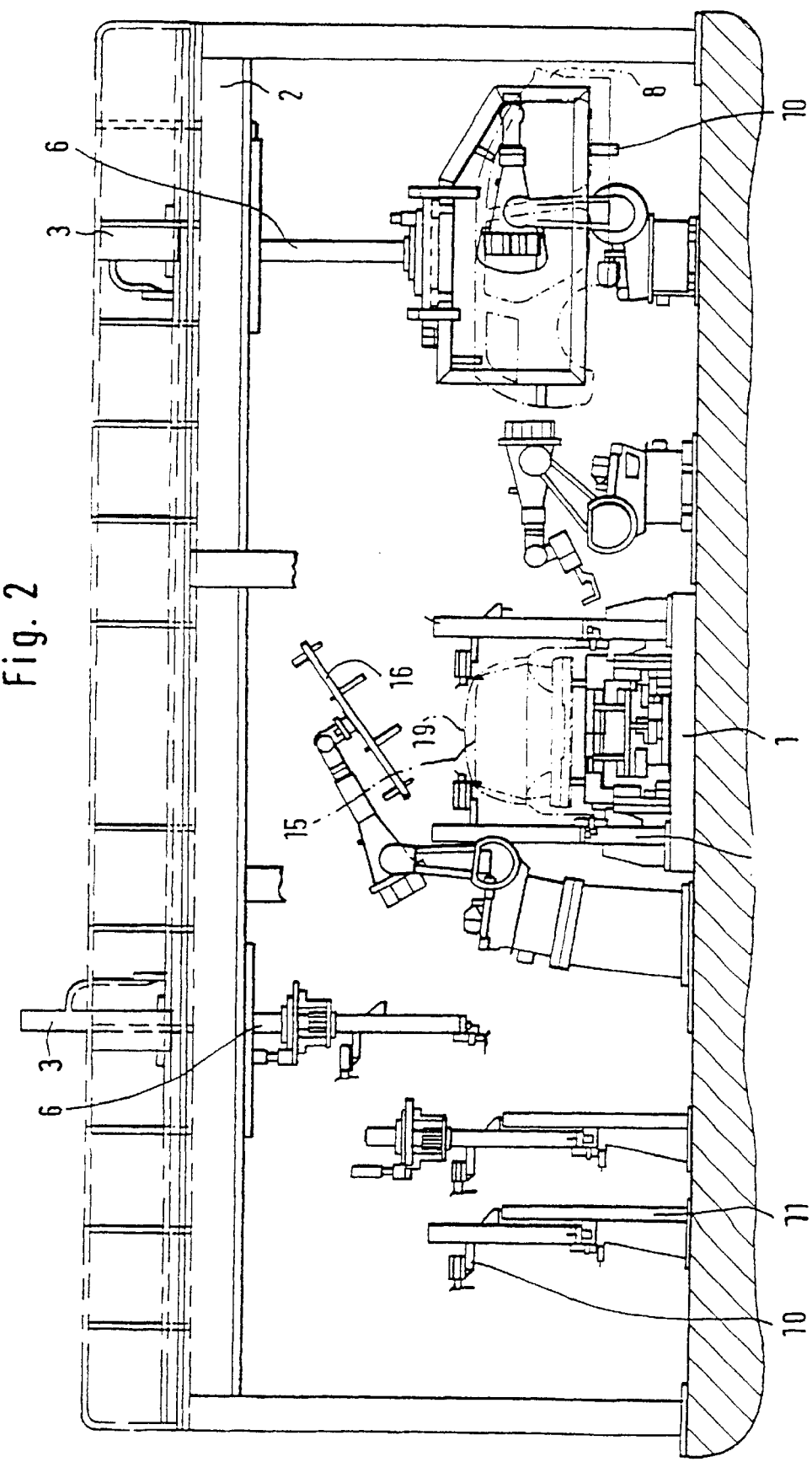
FIG. 2 is a front view as per Line Y of FIG. 1.
Figure 3:
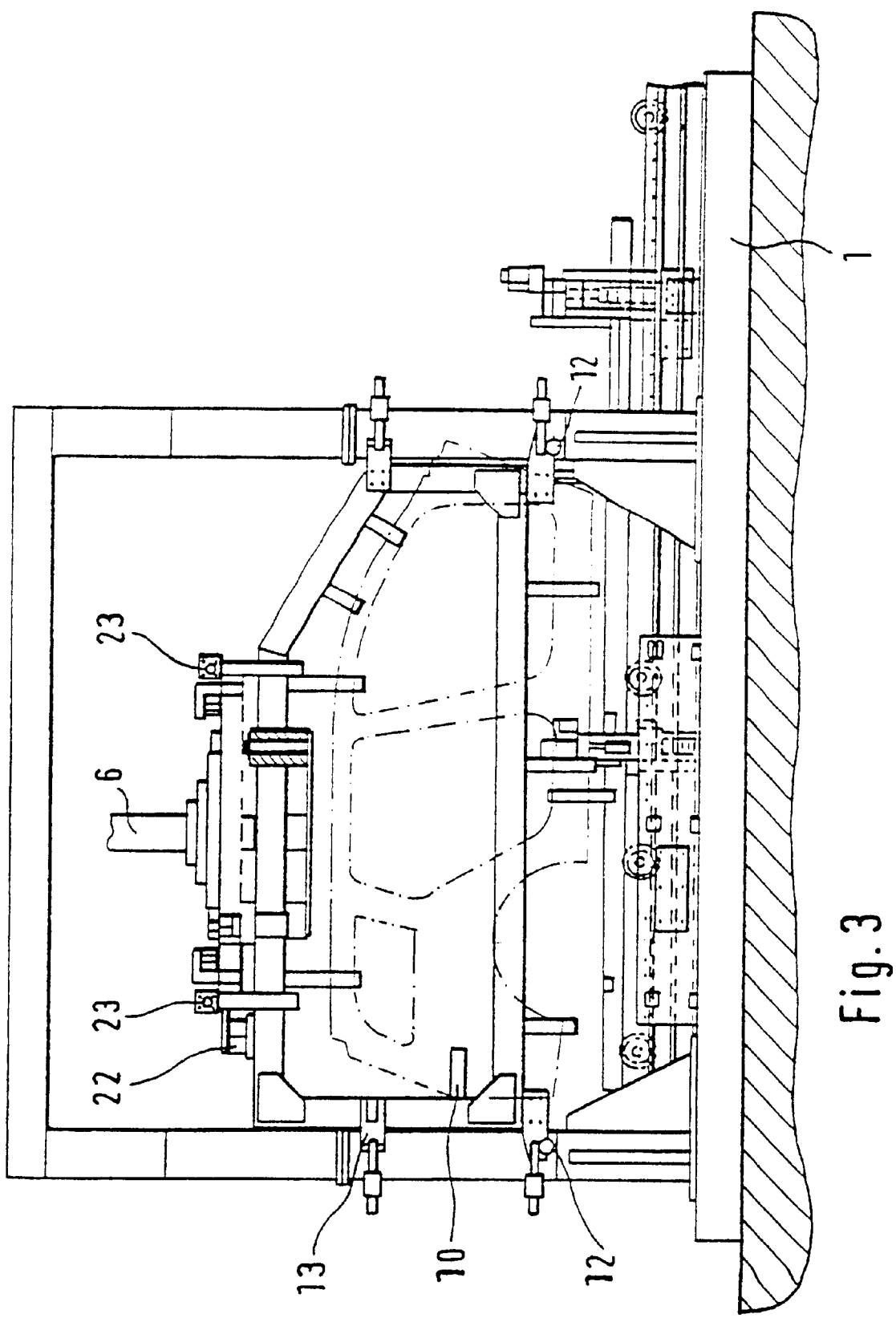
FIG. 3 is a section as per Line A—A of FIG. 1.

The front and rear roof cross beams 15 (hoops) are laid with one feeder unit 20/21 each onto the car body side sections 8 and fixed at the side section clamping frame 9. In addition, it is possible for another clamping frame 16, loaded with roof plate 19, to be brought into the frame welding station, positioned and clamped. Welding of the understructure group with car body side sections 8 as well as welding of roof cross members 15 with car body side sections 8 is accomplished by six robots 18 mounted at the ground floor. At its underside, portal robot 3 is equipped with a telescope 6 to lift and set down the side section clamping frame 9 into tool deposit 11 and, respectively, at the car body. To take-up the car body side sections 8, clamping arms 10 are arranged at the side section clamping frame 9 at various levels, properly adapted to the contour of the car body side section. Once the car body side section 8 has been positioned at the car body, the side section clamping frame 9 is fixed for geometric welding via lower and upper positioning and clamping elements 12, 13. Inside the tool deposit 11, for example, there are three positions for the side section clamping frame 9. FIG. 3, in particular, shows the car body conveyor system 1 including lifter as well as centering and clamping unit for the underbody group. The side section clamping frame 9 hangs at the lower part of telescope 6 of portal robot 3 and additionally it is connected to it via media coupling 22 and docking unit 23. The positioning and clamping elements 12 and 13 are affixed to stationary, vertical supports. Shown in more details in the lower section of FIG. 4 by Detail Z of FIG. 2 is the docking system for the side section clamping frame 9 with media coupling 22, docking unit 23 and flexible offset elements 24. The upper part of FIG. 4 additionally shows a View V relative to the lower part with a more detailed explanation of media coupling 22.

Figure 5:
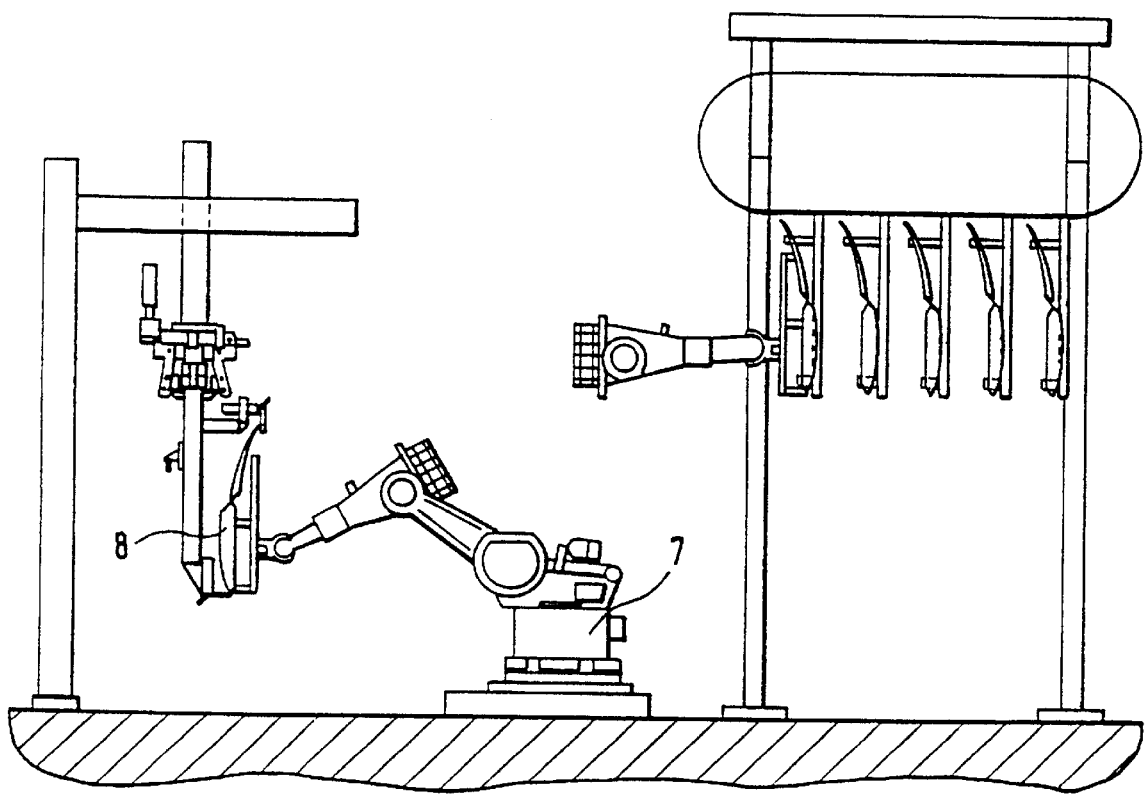
FIG. 5 is a view X relative to FIG. 1.
Figure 6:
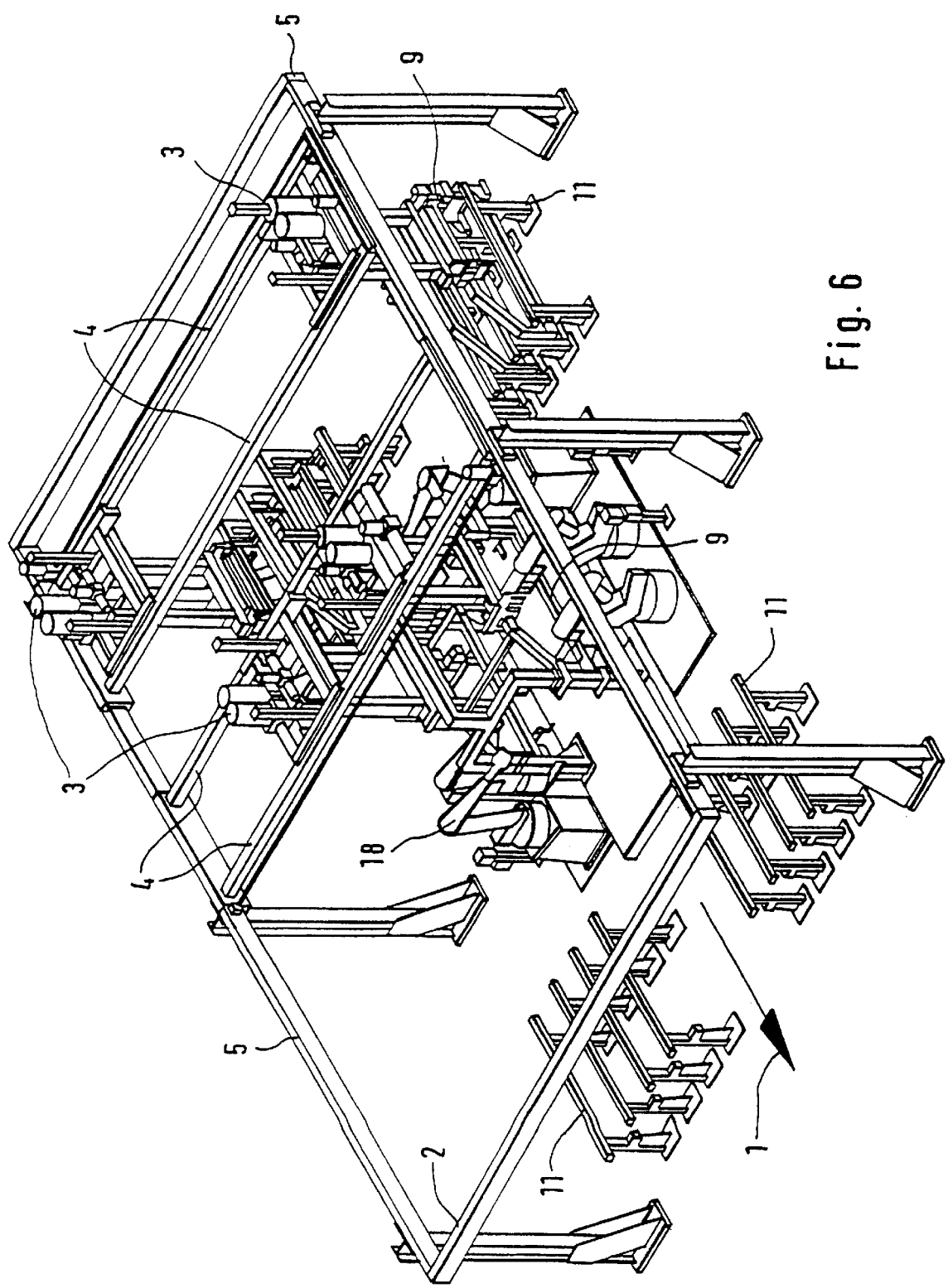
FIG. 6 is a perspective view of another execution style relative to FIG. 1.

Finally, FIG. 5 in a Side View X relative to FIG. 1 shows the arrangement of a robot 7 arranged laterally and stationary on the ground for feeding of a car body side section 8 to the side section clamping frame 9 from a piling unit located outside the four-axle portal 2. Alternatively, the car body side sections can also be laid manually by operators into the side section clamping frame 9. Upon take-up of the car body side section 8 by side section clamping frame 9, both parts can be raised by the aid of a telescope 6, turned at the portal robot around a vertical axle, if required, and then be moved through portal robot 3 inside the four-axle portal 2 at will, e.g. past robot 18 or beyond it up to the underbody arranged on car body conveyor system 1. There, the clamping frame 9 as one can see from FIG. 3—is firmly positioned and clamped by means of positioning and clamping elements 12, 13 at stationary vertical supports which are located in the area upstream and downstream of the car body. Once the car body side section 8 has been clamped with the relative parts of the car body, robot 18 firmly arranged on the ground can be moved for geometric welding between the two vertical supports, to which elements 12 and 13 are affixed, through to the car body side section 8 to effect geometric welding. By way of the inventive device, positioning of side section clamping frame 9 upstream of the car body and movement of robot 18 can be accomplished simultaneously or consecutively in short intervals without incurring the necessity of having to move the underbody further on the car body conveyor system 1. To change a side section clamping frame 9, e.g. to allow for another vehicle model, portal robot 3 can be moved to a tool deposit 11 which is also available in the area of the four-axle portal 2. FIG. 2 moreover shows that the clamping frame 16 for the roof cross member 15 can be actuated by a robot arranged on the ground beside the car body conveyor system 1. FIG. 6 shows the so-called megaframing station. Here, the stationary rails 5 are arranged in parallel beside the car body conveyor system 1. Located on the rails 5 are two cross members 4 movable independently of each other, each equipped with two portal robots 3. The two car body side sections are simultaneously connected with the raw car body by means of the two portal robots 3 of one cross member 4. In all of the four corner areas of the four-axle portal 2, there is a tool deposit 11 (clamping frame station) for side section clamping frames 9 so that portal robots 3 located on the second cross member 4 e.g. can take-up new side section clamping frames 9 in the area of tool deposit 11 concurrently to the joining of a raw car body.

Loading of side section clamping frames 9 with new car body components 8 at a suitable place not shown here can also be accomplished concurrently to the joining procedure.

While a specific embodiment of the invention has been shown and described in detail to illustrate the application of the principles of the invention, it will be understood that the invention may be embodied otherwise without departing from such principles.

What is claimed is:

1. A method for feeding, clamping and processing for geometric welding of car body components in a processing station, the method comprising the steps of:

providing a car body conveyor system;

providing a station for geometric welding with an elevated four-axle portal extending to each side of the conveyor system;

bringing car body components, including at least one front wall or at least one front wall and an underbody component group, with the car body conveyor system into the station for geometric welding and exactly positioning the car body components at the station;

clamping car body components to be welded;

laying car body side sections in a side section clamping frame;

providing a portal robot movable in X/Y directions at the elevated four-axle portal;

bringing side section clamping frames into the geometric welding station with the portal robot to position the side section clamping frames at both sides of the car body components;

clamping car body side sections with the components to be welded; and providing welding robots mounted laterally to the side of the car body conveyor system;

swinging welding robots mounted laterally beside the car body conveyor system and/or moving the robots towards the welding spots;

joining car body side sections to a car body structure by the aid of the welding robots arranged laterally and/or welding robots arranged above the car body by way of geometric welding; and subsequently welding the parts together completely.

2. A method according to claim 1, further comprising bringing the underbody group of the car body jointly with the at least one front wall with the car body conveyor system into the station for geometric welding and exactly positioning these there and joining the underbody group and roof sections to the car body structure by the aid of the welding robots.

3. A method according to claim 1, wherein the side section clamping frames are fixed prior to the welding procedure with the components to be welded using stationary positioning and clamping elements.

4. A method according to claim 1, wherein, said step of subsequently welding the parts together completely occurs in another welding station.

5. A method for feeding, clamping and processing car body components, the method comprising the steps of:

providing a car body conveyor system;

providing a station for geometric welding with an elevated four-axle portal extending to each side of the conveyor system;

bringing car body components, including at least one front wall or the at least one front wall and an underbody component group, with the car body conveyor system into the station and exactly positioning the car body components at the station;

clamping car body components to be welded;

laying car body side sections in a side section clamping frame;

providing a portal robot at the elevated four-axle portal, the portal robot being movable in orthogonal directions in a plane above the conveyor;

bringing side section clamping frames into the geometric welding station with the portal robot to position the side section clamping frames at both sides of the car body components;

clamping car body side sections with the components to be welded;

providing welding robots mounted laterally to the side of the car body conveyor system;

swinging welding robots mounted laterally beside the car body conveyor system and/or moving the robots towards the welding spots;

joining car body side sections to a car body structure by the aid of the welding robots arranged laterally and/or welding robots arranged above the car body by way of geometric welding; and subsequently welding the parts together completely.

6. A method according to claim 5, further comprising bringing the underbody group of the car body jointly with the at least one front wall with the car body conveyor system into the station for geometric welding and exactly positioning these there and joining the underbody group and roof sections to the car body structure by the aid of the welding robots.

7. A method according to claim 5, wherein the side section clamping frames are fixed prior to the welding procedure with the components to be welded using stationary positioning and clamping elements.

8. A method according to claim 5, wherein, said step of subsequently welding the parts together completely occurs in another welding station.

* * * * *